(12) United States Patent
Bower et al.

(10) Patent No.: US 8,833,292 B2
(45) Date of Patent: Sep. 16, 2014

(54) INDICATORS

(75) Inventors: Christopher L. Bower, Cambridgeshire (GB); Christopher B. Rider, Hardwick Cambridgeshire (GB)

(73) Assignee: Eastman Kodak Company, Rochester, NY (US)

( * ) Notice: Subject to any disclaimer, the term of this patent is extended or adjusted under 35 U.S.C. 154(b) by 745 days.

(21) Appl. No.: 12/685,007

(22) Filed: Jan. 11, 2010

(65) Prior Publication Data

US 2010/0175610 A1 Jul. 15, 2010

(30) Foreign Application Priority Data

Jan. 13, 2009 (GB) .................................. 0900453.2

(51) Int. Cl.
*G01K 11/08* (2006.01)
*G01K 3/04* (2006.01)

(52) U.S. Cl.
CPC . *G01K 11/08* (2013.01); *G01K 3/04* (2013.01)
USPC .......................................... 116/216; 116/207

(58) Field of Classification Search
CPC ............ G01K 11/08; G01K 3/04; G01K 1/02
USPC ........... 116/206–207, 216–220; 374/106, 162
See application file for complete search history.

(56) References Cited

U.S. PATENT DOCUMENTS

| | | | | | |
|---|---|---|---|---|---|
| 2,460,215 | A | * | 1/1949 | Chase | 426/88 |
| 2,614,431 | A | * | 10/1952 | Brady | 374/105 |
| 3,420,205 | A | * | 1/1969 | Morison | 116/200 |
| 3,521,489 | A | * | 7/1970 | Solan et al. | 374/106 |
| 3,895,523 | A | * | 7/1975 | Nollen | 374/162 |
| 4,098,120 | A | * | 7/1978 | Manske | 116/200 |
| 4,222,268 | A | * | 9/1980 | Greenberg et al. | 374/105 |
| 4,229,813 | A | * | 10/1980 | Lilly et al. | 368/89 |
| 4,339,207 | A | * | 7/1982 | Hof et al. | 374/160 |
| 4,353,990 | A | * | 10/1982 | Manske et al. | 435/287.4 |
| 4,362,645 | A | * | 12/1982 | Hof et al. | 252/408.1 |
| 4,457,252 | A | * | 7/1984 | Manske | 116/216 |
| 4,457,253 | A | * | 7/1984 | Manske | 116/216 |
| 4,907,896 | A | * | 3/1990 | Martuscello et al. | 374/190 |
| 5,120,137 | A | * | 6/1992 | Ou-Yang | 374/106 |
| 5,215,378 | A | * | 6/1993 | Manske | 374/105 |
| 5,325,721 | A | * | 7/1994 | Pendergrass, Jr. | 73/762 |
| 5,368,905 | A | * | 11/1994 | Ohno | 428/34.1 |
| 5,528,563 | A | * | 6/1996 | Tothill et al. | 368/327 |
| 5,667,303 | A | * | 9/1997 | Arens et al. | 374/102 |
| 5,709,472 | A | * | 1/1998 | Prusik et al. | 374/106 |
| 5,717,972 | A | * | 2/1998 | Patton et al. | 396/515 |

(Continued)

FOREIGN PATENT DOCUMENTS

JP 06-050827 2/1994

*Primary Examiner* — R. A. Smith
*Assistant Examiner* — Tania Courson
(74) *Attorney, Agent, or Firm* — Andrew J. Anderson; Raymond L. Owens (57) ABSTRACT

An indicator device includes a surface provided with at least one channel or at least one through-hole with at least two openings, wherein flowable material in an immobile state is provided adjacent to the channel or adjacent to a first opening of the through-hole, such that after application of a stimulus the material is directed along the channel by the action of capillary forces or into the at least one through-hole by the action of capillary forces and emerges at a second opening, thereby providing an indication of the application of the stimulus.

11 Claims, 7 Drawing Sheets

(56) References Cited

U.S. PATENT DOCUMENTS

| | | | |
|---|---|---|---|
| RE36,062 E * | 1/1999 | Speelman et al. | 374/102 |
| 5,930,206 A * | 7/1999 | Haas et al. | 368/327 |
| 5,940,637 A * | 8/1999 | Manico et al. | 396/207 |
| 5,997,927 A * | 12/1999 | Gics | 426/383 |
| 6,043,021 A * | 3/2000 | Manico et al. | 430/617 |
| 6,103,351 A * | 8/2000 | Ram et al. | 428/195.1 |
| 6,452,873 B1 * | 9/2002 | Holt et al. | 368/327 |
| 6,568,799 B1 * | 5/2003 | Yang et al. | 347/85 |
| 6,741,523 B1 | 5/2004 | Bommarito et al. | |
| 6,968,804 B1 * | 11/2005 | Barbieri et al. | 116/219 |
| 6,989,349 B2 * | 1/2006 | Tatewaki et al. | 503/201 |
| 7,004,621 B2 * | 2/2006 | Roberts et al. | 374/106 |
| 7,219,619 B2 * | 5/2007 | Fitzer et al. | 116/203 |
| 7,232,253 B2 | 6/2007 | Isbitsky et al. | |
| 7,240,855 B2 * | 7/2007 | Takagi et al. | 239/102.2 |
| 7,254,095 B1 * | 8/2007 | Braunberger | 368/327 |
| 7,372,780 B1 * | 5/2008 | Braunberger | 368/114 |
| 7,463,558 B2 * | 12/2008 | Braunberger | 368/327 |
| 7,490,575 B2 * | 2/2009 | Taylor et al. | 116/216 |
| 7,517,146 B2 * | 4/2009 | Smith et al. | 374/162 |
| 7,571,695 B2 * | 8/2009 | Taylor et al. | 116/216 |
| 7,891,310 B2 * | 2/2011 | Taylor et al. | 116/216 |
| 8,061,294 B2 * | 11/2011 | Suda et al. | 116/216 |
| 8,104,949 B2 * | 1/2012 | Robinson et al. | 368/89 |
| 8,158,450 B1 * | 4/2012 | Sheats et al. | 438/57 |
| 8,267,576 B2 * | 9/2012 | Haarer et al. | 374/102 |
| 8,343,437 B2 * | 1/2013 | Patel | 422/424 |
| 8,539,905 B2 * | 9/2013 | Cady et al. | 118/300 |
| 2005/0107870 A1 * | 5/2005 | Wang et al. | 623/1.44 |
| 2006/0011124 A1 | 1/2006 | Odashiro | |
| 2006/0065183 A1 * | 3/2006 | Drummond et al. | 116/217 |
| 2007/0245947 A1 * | 10/2007 | Riemelmoser | 116/217 |
| 2008/0184927 A1 * | 8/2008 | Pham et al. | 116/207 |
| 2008/0290174 A1 * | 11/2008 | Norrby et al. | 235/487 |
| 2009/0010304 A1 * | 1/2009 | Skinner et al. | 374/102 |
| 2009/0061076 A1 * | 3/2009 | Rosicke et al. | 427/66 |
| 2009/0255535 A1 * | 10/2009 | Kanzer | 128/206.14 |
| 2010/0162940 A1 * | 7/2010 | Hill et al. | 116/206 |
| 2010/0251955 A1 * | 10/2010 | Knoll | 116/206 |
| 2011/0011330 A1 * | 1/2011 | Moses et al. | 116/216 |
| 2011/0017123 A1 * | 1/2011 | Maschietti et al. | 116/216 |
| 2011/0155043 A1 * | 6/2011 | Haarer et al. | 116/201 |
| 2011/0271895 A1 * | 11/2011 | Park | 116/216 |
| 2012/0079981 A1 * | 4/2012 | Huffman et al. | 116/207 |
| 2012/0236900 A1 * | 9/2012 | Hubbard et al. | 374/102 |

* cited by examiner

EFFECT OF GRAPHITE INK FILLING CHANNELS

INDICATORS

FIELD OF THE INVENTION

The invention relates to low cost indicator devices, based upon controlled capillary wicking of a liquid, and the manufacture thereof. The indicator devices are such that they can be readily integrated into the packaging of an article of goods to serve as an indicator of maximum temperature exposure, light exposure, or authenticity.

BACKGROUND OF THE INVENTION

It is often desirable to be able to provide an indication of whether a product has been exposed to undesirable temperature history or UV exposure. This applies to perishable goods such as foods, pharmaceutical products or photographic products which have a limited lifetime that may be shortened by exposure to extreme environmental conditions.

A variety of devices are available to provide this information. These may be divided broadly into two classes, those that contain electronics to enable sensing, display and data recording, and simpler devices which contain no electronics. Whilst the cost of electronic components is continually being reduced due to economies of scale and mass manufacture, for many packaging applications the cost of the device and the integration required is still prohibitive. Of the second class of device, which contains no electronics, several examples exist. For instance US 2006/0011124 describes a temperature sensitive label that may be fixed to a package. The label has a mixture containing a petroleum wax that melts at a prescribed temperature. Upon melting, the wax penetrates into a coloured layer making it transparent and so allowing a coloured face beneath the coloured layer to become visible. A similar device that may be incorporated onto a package is described in JP 6050827A. This document discloses a hot-melt substance encapsulated within a pressure sensitive blister that may be depressed to allow the hot-melt substance to come into contact with an absorbing medium. The absorbing medium has a pattern written above it such that after pressing the blister, when a prescribed temperature is reached a message can be displayed upon the package. A similar device, described in U.S. Pat. No. 7,232,253, uses a migration medium of controlled porosity to measure elapsed time by the ingress of a coloured liquid into the migration medium. By changing the porosity of the medium and the viscosity of the coloured liquid the device can be used to measure different time periods. The device is incorporated into a self-adhesive label that may be affixed to items of food to give a visual indication when the item has reached the expiry date.

U.S. Pat. No. 6,741,523B1 describes a time dependent indicator formed using a complex microstructured substrate in which fluid is separated from the microstructured substrate until the indicator is activated, at which point the fluid progresses through the channels of the microstructured substrate at a known rate. Fluid may be separated by a physical barrier which can be ruptured at the time of activation to allow the fluid to come into contact with the microchannels.

PROBLEM TO BE SOLVED BY THE INVENTION

The present invention aims to solve the problem of how to create a simple, thin, low cost indicator device such as may be incorporated into the packaging of an article of goods to provide indication of exposure to an external stimulus or extreme environmental conditions or provide product authenticity.

SUMMARY OF THE INVENTION

According to the present invention there is provided an indicator device comprising two surfaces, the first surface being provided with at least one channel, the second surface being provided with flowable material in a solid state, wherein the two surfaces are brought together such that the flowable material is adjacent to the channel, wherein, after application of a stimulus, the flowable material becomes mobile and is directed along the channel by the action of capillary forces thereby providing an indication of the application of the stimulus.

The present invention further provides an indicator device created on a surface, the surface being provided with at least one channel, wherein the surface is also provided with fluid adjacent to the channel and wherein the wetting characteristics of the fluid and at least part of the surface prevent the fluid from wicking along the channel, such that after application of a stimulus, the wetting characteristics of the fluid and the at least part of the surface are altered such that the fluid becomes mobile and is directed along the channel by the action of capillary forces thereby providing an indication of the application of the stimulus.

The present invention also provides an indicator device created on a surface, the surface being provided with at least one through-hole with at least two openings, wherein flowable material in an immobile state is provided adjacent to a first opening, such that after application of a stimulus the material is directed into the at least one through-hole by the action of capillary forces and emerges at a second opening thereby providing an indication of the application of the stimulus.

The present invention further provides corresponding methods of indicating exposure of devices.

ADVANTAGEOUS EFFECT OF THE INVENTION

The present invention overcomes the problem of creating a low cost indicator device for use on the packaging of an article of goods. It has a simple design which can be easily fabricated by existing manufacturing methods, for example in an inline roll-to-roll process. No complex opto-electronics are required so the method is sufficiently low cost to allow it to be incorporated in packaging applications. The effect is irreversible, which allows it to be used to create indicators that are triggered by exposure to a stimulus, for example to temperature above a prescribed level and then remain in that state, even when the temperature falls below the prescribed level.

Since in its simplest implementation all that is required is a channel and a flowable material adjacent to the channel, the invention can be used to create indicators on a wide variety of surfaces, such as the packaging material of an article, or the article itself. Since the channel does not have to be confined to planar surfaces the indicator could be created on a three dimensional surface or object. As the channel is created either in the packaging material or on the object to be packaged itself, the indicator is very thin and does not require an extra substrate on which the indicator has been manufactured to be attached to the packaging material. Furthermore, the cost of extra substrate material is eliminated by using the actual packaging material as the indicator substrate.

The indicator can be operational from the moment it is created, thus reducing cost and complexity of the device, or if it is preferred, the device can be made operational at a later stage using an activation process which does not require the physical rupturing of barriers and thus avoids extra mechanical parts.

This invention is particularly suited to low cost manufacture by roll to roll processes, including printing, embossing and punching. Indicators of the present invention can be made directly onto packaging at the time of printing, by using the printing process to deposit the flowable material, embossing processes to make the channels and punching processes to make through holes. Lamination and cutting processes are also well known in the label printing industry and these techniques may also be used to further enhance the performance of indicators of the present invention.

If the channel is combined with a through-hole, then the flowable material can be located on the inside of the packaging material so as to give a more accurate reading of the temperature inside the packaging. Some control of the time it takes for the liquid to flow along the channel can be achieved by changing the channel width, channel geometry, the surface energy or surface texture of the channel or the viscosity or surface tension of the flowable material. A further benefit of the through-hole geometry is that coloured flowable material deposited on the inside of the packaging material may be obscured from view by the packaging material.

In addition, the channel or channels can be fabricated into a prescribed pattern to allow the creation of text or images which may be unseen until the flowable material enters the channel. In this way a visual warning may be created that is only visible after the device has been exposed to a prescribed environmental stimulus such as a set temperature, or level of UV light for instance. For security or authenticity verification applications the indication can be done using a flowable material having unique reflective or absorptive properties that are only visible when illuminated with UV or IR light to provide an indication that requires a reader device to verify.

BRIEF DESCRIPTION OF THE DRAWINGS

The invention will now be described by way of example with reference to the accompanying drawings in which.

DETAILED DESCRIPTION OF THE INVENTION

In a preferred embodiment of the invention, immobile flowable material resides on the surface of the indicator either in contact with a part of or adjacent to at least one channel in a reservoir area. It should be understood that a preformed reservoir area is not essential to the invention.

Within the context of the present invention, a "channel" may be understood to be any surface topology which constrains liquid flow across the surface and which benefits, at least in some regions of the channel, from capillary forces to enhance liquid flow within the channel. Channels may be simple elongate relief structures such as V grooves or they may have rectangular or semi-circular cross sections. Channels may also comprise more complex relief patterns defining, in plan view, shapes of letters or symbols on the surface. The transverse dimensions of channels may be small with respect to the capillary length which is typically a few millimeters, or they may be large, but in the case of large channels, the boundary of the channel will be defined by a surface relief profile which benefits from capillary forces to enhance liquid flow within a capillary length of the boundary and consequent enhancement of the flow of liquid within the whole channel. Flow within channels of large transverse dimensions with respect to the capillary length, may be enhanced by texturing the base of the channel with, for example, shallow microgrooves which enhance flow by capillary forces. The boundaries of channels which benefit from enhanced capillary flow through microtexturing of the channel base may be defined by a change of surface wettability or they may be defined by a topological feature. Channels within the context of the present invention do not include structures where there is no flow enhancement from capillary forces, for example, flow along flat-topped elevated ridges or flat surfaces bounded by contours with poor wettability. In these examples, the channel constrains the flow across the surface but does not provide any enhancement of the flow versus the case of unconstrained free surface flow on a flat surface. Such channel structures will suffer from poor flow characteristics and may suffer from performance variability due to surface contaminants and the increased effects of evaporation of the flowing liquid as it moves within the channel.

FIG. 1 shows a side view (FIG. 1a) and a plan view (FIG. 1b) of a surface 11 in which a reservoir region 10 has been created, the reservoir region 10 being adjacent to a channel 13. In FIG. 1c (side view) and FIG. 1d (plan view) the reservoir region has been filled with flowable material. If the flowable material is liquid it may be immobilised in the reservoir region by controlling the wetting characteristics of the liquid and/or the channel. Liquid will only be driven along the channel by capillary forces if the contact angle is below a critical value; dependant upon the surface energy of the channel, the geometry of the channel and the surface tension of the liquid, see for instance: Ralf Seemann, Martin Brinkmann, Edward J. Kramer, Frederick F. Lange, and Reinhard Lipowsky: "Wetting morphologies at microstructured surfaces" DOI10.1073/pnas.0407721102 PNAS Feb. 8, 2005 vol. 102 no. 6 1848-1852. By choosing the correct wetting characteristics liquids can be immobilized within the channel until energy is applied.

When energy is applied to the material it becomes mobile. Energy can be applied as heat from ambient surroundings by convection and conduction or by radiation as electromagnetic radiation of all frequencies but particularly including uv, visible and infrared light and microwaves. Heat may also be generated by exothermic chemical reactions and from phase changes which can be triggered by application of an external stimulus such as bending or flexing to induce crystallisation in a supersaturated solution, for example supersaturated sodium acetate trihydrate solutions. Materials that become mobile when energy is applied would include phase change inks and microgel based inks, which can change viscosity by several orders of magnitude when the temperature is increased beyond a certain critical temperature, see for instance "Temperature sensitive microgel suspensions: Colloidal phase behavior and rheology of soft spheres", H. Senff and W. Richtering, J. Chem. Phys. 111, 1705 (1999), DOI: 10.1063/1.479430

The application of energy may change the wetting characteristics of the channel by changing its surface energy, or it may lower the surface tension of the liquid, or it may change the geometry of the channel, for instance by making the channel angle sharper as a surface is compressed or stretched. A single change or a combination of these changes then allows the flowable material to be driven along the channel by capillary forces.

Figure 1A:
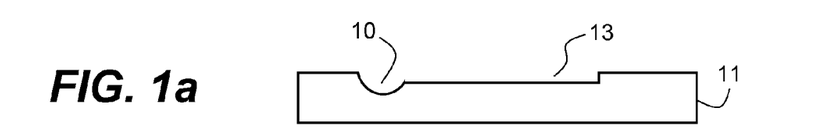
FIGS. 1a to 1d show cross-sectional and plan views of a surface with a channel and flowable material adjacent to the channel in a reservoir area.
Figure 1B:
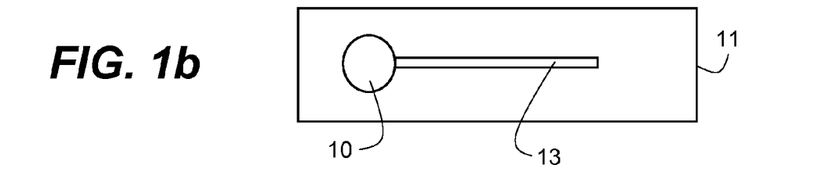
Figure 1C:
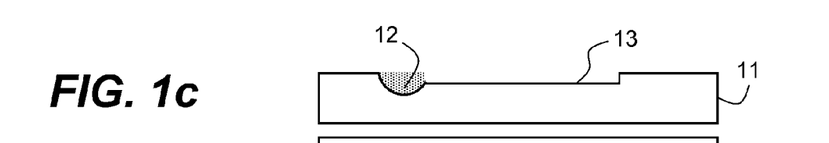
Figure 1D:
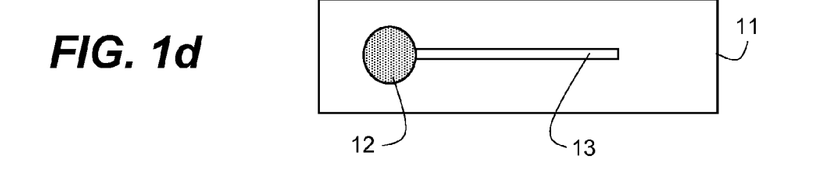
Figure 1E:
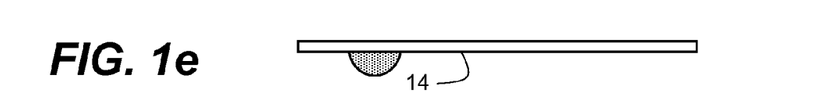
FIGS. 1e to 1g show means of bringing flowable material into contact with the channel using a transparent laminate.
Figure 1F:
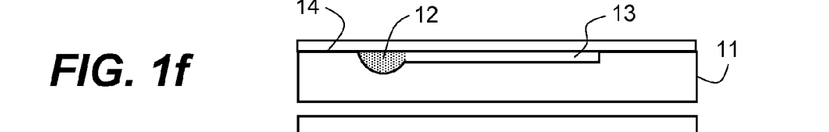
Figure 1G:
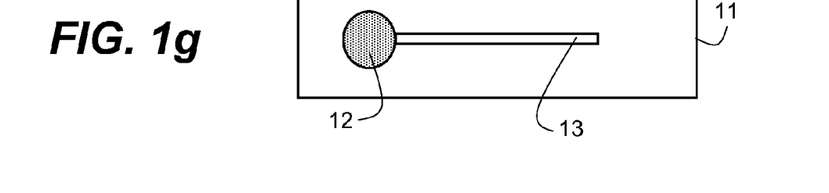

A solid—liquid phase change may also be used to immobilise flowable material, and allow construction of the indictor devices without the material immediately wicking along the capillary channels. For instance, the channels can be cooled to allow immediate solidification of the flowable material upon contact, thus allowing device fabrication by printing of the flowable material. Types of material that display this property would be a low melting point solid, such as, for example, solders and waxes such as petroleum wax. Devices using these materials can be constructed according to the present invention by depositing the flowable material upon a second surface 14 (shown in FIG. 1e) which may be chilled to aid immobilisation, the second surface is then brought into at least partial contact with the reservoir 12 and channel 13 and may form an encapsulating barrier layer (shown in FIG. 1f). Since the reservoir region 12 is adjacent to the channel 13 once the viscosity of the flowable material has dropped the material may flow from the reservoir area and is directed into the channel by capillary forces. Once this has occurred the process is irreversible, the flowable material remaining in the channel 13. The reservoir region may also be located adjacent to but separated from the channel, such that when the material becomes fluid and starts to wet the surface of the indicator between the reservoir region and the channel, as the material spreads, a part of the wetting line will come into contact with the channel and be directed into the channel by the action of capillary forces between the fluid and the channel walls.

Figures 2A, 2B:
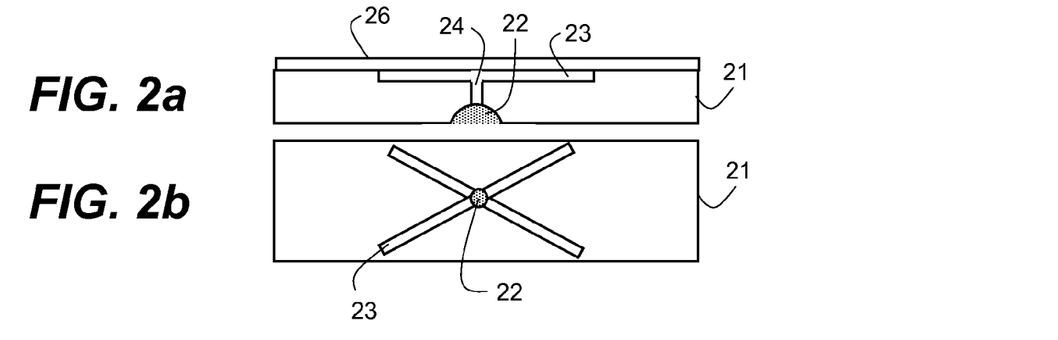
FIGS. 2a to 2e illustrate an embodiment in which channels are arranged to form a cross shaped image and are connected to a reservoir region on the opposite side of the substrate by a through hole.
Figure 2C:
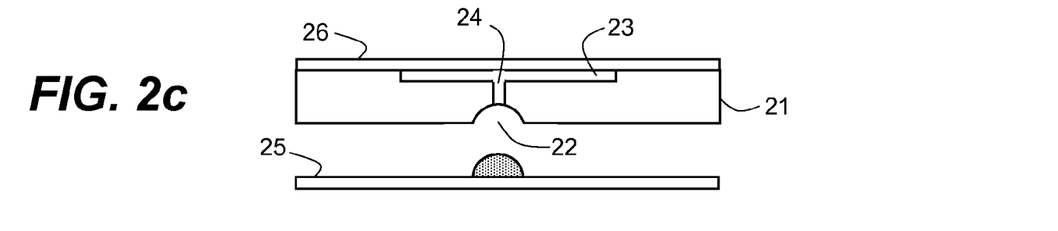
Figure 2D:
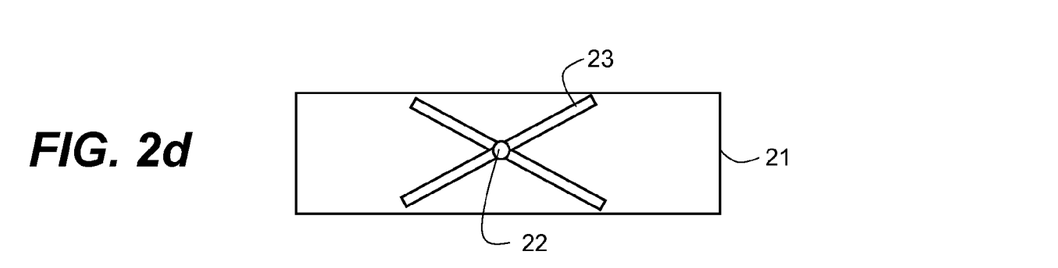
Figure 2E:
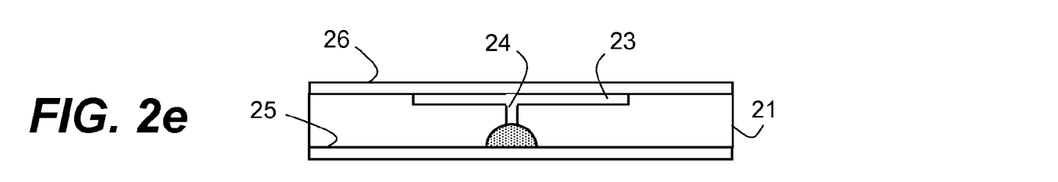

FIGS. 2a to 2e illustrate another embodiment, in which the reservoir region 22 of flowable material is on the opposite side of a substrate, or surface, to a channel or channels 23. The reservoir region 22 is connected to the channels 23 by a through-hole 24. In this embodiment the reservoir 22 of flowable material may be hidden from view by an opaque substrate and the flowable material may only be visible after passage through the hole. When energy is applied to the flowable material, it becomes mobile and is drawn into the through-hole 24 and subsequently along the channels 23 by capillary forces. The flowable material may be coloured and the channels can be arranged to form text or an indicator image that becomes visible once the channels are filled. In this case the device may be created directly on the packaging for an article, and the flowable material may be in communication with the interior of a package or its contents, such that some change inside the package causes the flowable material to enter the through-hole and then fill the channels on the top surface of the package.

Where it is desired to shield the contents of the package from the outside environment a transparent laminate 26 may be placed over the channel and hole region. This also prevents loss of flowable material from the indicator if it comes into contact with any object which may be touching the outer surface of the packaging. It may also be desired to shield the contents of the package from the flowable material and this may be done by applying a piece of laminate film over the deposited material and laminating it to the indicator. It is also possible to deposit the flowable material on the piece of laminate film 25, as shown in FIGS. 2c (side view) and 2d (plan view), and bring the film into contact with or adjacent to the through-hole so that the flowable material is assembled into the indicator device in its solid state, as shown in FIG. 2e. If a laminate is applied either to the front or the back surface of the indicator, it may be necessary to enable the movement of air out of the channel region as the flowable material moves along the channel. This may be readily achieved by providing microporosity in the laminate, where the micropores are not wetted by the flowable material. It is also readily achieved by providing other through-holes (not shown) which connect the ends of the channels back to the inner surface of the substrate, thus providing a route for gas to escape.

Figure 3:
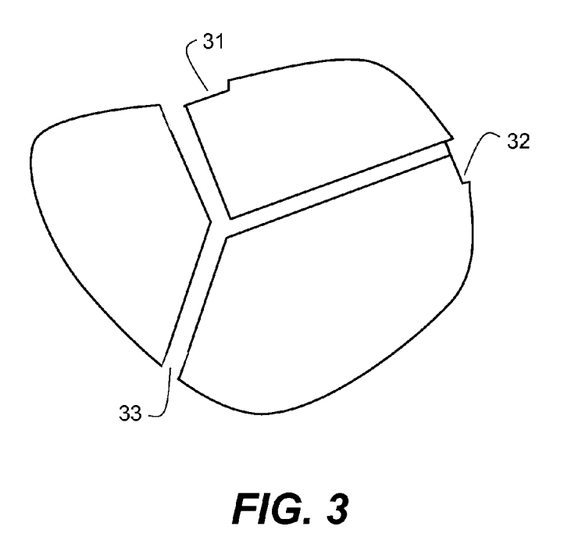
FIG. 3 shows a cross-section of a three dimensional surface having a through hole which can be used to direct flowable material to connect to two channels or devices.

In another embodiment, a through-hole only is provided without a connected channel, and upon exposure to the stimulus, the flowable material located adjacent to one of the hole's openings flows into and through the hole and appears at another opening. In some applications this may provide enough of an indication without an additional channel. This approach is particularly beneficial if the flowable material is conductive and the action of flowing into the through-hole connects conductive structures located adjacent to each opening of the through-hole. By making a circuit or closing a switch in this way, a suitable indication of the application of the stimulus is readily obtained. Another approach using this embodiment connects two optical waveguides adjacent to each opening of the through-hole, so that an optical circuit is formed. It may be advantageous to provide several through-holes which connect to a single deposit of flowable material, so that multiple connections may be made upon application of the stimulus. FIG. 3 shows the cross-section of a three-dimensional object in which two separate channels 31 and 32 are connected to a single source through-hole 33, such that flowable material entering through-hole 33 can be used to connect both channels 31 and 32. Channels 31 and 32 may be connected to other electronic devices (not shown) such that after movement of flowable conductive material from the reservoir (not shown) adjacent to through-hole, through the through-holes 33 and along channels 31 and 32, the two electronic devices are electrically connected, thus providing an indication of the application of a stimulus.

In another embodiment the surface energy of the channels or through-holes is changed by exposure to an external stimulus. In this embodiment flowable material in or adjacent to the channels or through-holes remains immobile but in a liquid state until the surface energy of the channels or through-holes makes it favourable for the material to be driven through the holes or along the channels by capillary forces. In this embodiment the flowable material can be a liquid over a larger temperature range, since an increase in viscosity or solidification is not required to immobilise the liquid and prevent it flowing through the holes or along the channels. This can be achieved by changing the surface energy of the holes or channels, for instance by applying over the surface of the holes or channels a thin layer of titania or other material which has wetting characteristics that are sensitive to the level of UV or visible light exposure. In the case where the indicator device comprises only channels and not through-holes, if the surface energy of the channels is low, this implies a high contact angle for the flowable material. The flowable material will only be driven along the channels when the contact angle is below some critical angle which is defined by the geometry of the channel, the surface tension and the viscosity of the flowable material. After exposure to UV light the surface energy of the titania can be increased, thereby decreasing the contact angle. When the contact angle falls below the advancing contact angle the material will then be driven down the channels by capillary forces. The titania layer may also be used as a catalytic layer which is activated by exposure to UV light such that further layers deposited on top of the titania may be catalytically removed or rendered hydrophilic. For example, it is possible to deposit thin layers of fluoroalklysilanes on top of catalytic titania layers such that a very high contact angle surfaces of the order 100 degrees or more can be switched to a very low contact angle surface after exposure to UV light, see for instance: Kiyoharu Tadanaga, Noriko Katata, Tsutomu Minami, "Super-Water-Repellent Al2O3 Coating Films with High Transparency" Journal of the American Ceramic Society, 80, 4, 1040-1042, 1997 DOI: 10.1111/j.1151-2916.1997.tb02943.x and Shutao Wang, Yanlin Song, Lei Jiang, "Photoresponsive surfaces with controllable wettability", Journal of Photochemistry and Photobiology C: Photochemistry Reviews, Volume 8, Issue 1, March 2007, Pages 18-29, ISSN 1389-5567, DOI: 10.1016/j.jphotochemrev.2007.03.001.

This process may be used to create devices that respond to the amount of UV radiation exposure. If such an indicator is created on a label, this could be used to measure the UV exposure and so help avoid sunburn by giving an indication of the received dose. Alternatively devices can be created in which the activation is achieved by exposure to UV light.

This approach can also be used to simultaneously sense the presence of two stimuli, for example a threshold temperature being exceeded and an integrated UV light exposure to change the surface energy of through-hole and channel regions. Exceeding the threshold temperature causes the flowable material to become liquid and the UV exposure renders the surface wettable to the liquid thus enabling it to flow. Alternatively, a UV exposure might be used to activate the device such that when the flowable material becomes mobile following the application of a stimulus, the indicator will work as desired. Before the UV exposure is made, even if the stimulus is applied to the indicator, the flowable material will not be able to flow along the channel because the wetting characteristics prevent this from happening. Activation may be used to promote a long shelf-life for the indicator or to prevent it from indicating the application of a stimulus before it is desired. Activation using a UV exposure is readily achieved without contact by passing the indicator under a UV lamp for a defined period.

In a further embodiment, the indicator device contains an electronic component, such as a resistor, capacitor, inductor or antenna, diode, transistor, etc., or a complete electronic or optoelectronic circuit. When the stimulus is applied, flowable material moving along the channel changes a characteristic of the electronic component or circuit (such as resistance, inductance or capacitance) in a detectable way, such that by measuring that characteristic of the element at time of manufacture and at some later time, it is possible to determine whether or not the stimulus has been applied. Another well-known method of determining whether or not the stimulus has been applied is by fabricating two identical circuit elements or complete circuits where one is affected by the movement of the flowable material and the other is not, due to its location away from a channel. It is then possible to make a measurement of both elements and thus determine whether the characteristic of the "active element" is the same or different from the "calibration element". Flowable material used in this embodiment frequently has some electrical characteristic itself. In its simplest use, conductive material may flow along the channel to form a conductive path between two previously unconnected circuit elements. Making connections in this way can be used to make an electronic indication of the application of a stimulus, for example, by completing a circuit to turn on a light or causing charge to flow to change the colour of an electrochromic element. Another example of this technique is used to make an antenna, by flowing conductive liquid along a path or by connecting several parts of a previously unconnected antenna, such that after application of the stimulus, the antenna now functions correctly at a pre-determined frequency and may be addressed remotely. Conductive liquids may also be used not just to switch on a circuit element or circuit but also to change a pre-existing electronic characteristic, for example they may change the resistance of a previously fabricated resistor. A conductive liquid forming a circuit path between two ends of a previously fabricated resistor would reduce the resistance of that resistor. Similarly the Q factor of an antenna can be changed by flowable conductive material flowing along previously formed conductive tracks to further reduce their sheet resistance.

The size, thickness and material characteristics of such an economic printable antenna-with-tuning-capacitor arrangement are such that resonance frequencies in the range 1-30 MHz might be reasonably attained, and that a variation in that resonance frequency of up to 4× might be achieved as the flowable material imbibes the structure. The Q-factor of the printable antenna-with-tuning-capacitor arrangement limits the accuracy with which any information regarding the extent, or progress of the flowable material carried via the resonant frequency can be recovered; nevertheless at least 2-bits of accurate information can be anticipated. In this manner a remote readable, sensor device can be fabricated at low cost since no additional electronics are required.

Flowable material may also be an etchant which removes previously deposited material from pre-existing circuit elements or circuits. This can be used to break electrical connections in a circuit or it can be used to remove a proportion of material from a previously existing component and thus change its electrical characteristics, for example its resistance, capacitance or inductance.

It is also possible to change the optical characteristics of an optical or photonic component, such as a waveguide or diffraction grating by adding transparent material onto the component. In its simplest embodiment, optical waveguide connections can be made, in an analogous manner to that described above for the electronic circuits. Alternatively, flowable material can be used to change other characteristics of optical or photonic elements. For example, in the case of a diffractive element, the refractive index of the flowable material might change the angles of the diffraction orders of the diffractive element compared with that of an inactivated indicator containing a diffractive element where the stimulus had not yet been applied. In the case of a waveguide, the waveguide modes can be changed by the addition of material to the outer surface of the waveguide (providing it has either no cladding or a sufficiently thin cladding) where the refractive index of the added material is different from the waveguide itself. In the case of photonic crystal structures, the flowable material may shift or destroy the photonic bandgap of the material by in-filling the pores of the structures with flowable material of a different refractive index. When the flowable material is an etchant, optical connections may be broken or optical characteristics of photonic circuit elements may be changed in a detectable manner.

A further embodiment of the invention has channels arranged to create a bar code or other optically readable structure in which there is a detectable change in at least one of its characteristics, such as spectral reflectance or angular distribution of reflected light, once the channels are filled with flowable material. In the simplest embodiment, the flowable material contains a black or highly coloured dye such that once the channels are filled the pattern creates a bar code which can be read by a standard bar code reader. A similar effect can be achieved by making the channels very small so that they only become visible once they are filled with the flowable material and a dye which increases the contrast of the filled channels. An extension to this is a covert version, in which the flowable material contains an IR or UV adsorbing dye which is only visible under the correct illumination.

Example 1

Embossed channels were created in 100 µm thick PET film, using a circular cutting tool pressed into the substrate. This resulted in a circular channel with a diameter of approximately 10 mm and a 'V' shaped cross section with a width of approximately 50 µm. A small section of the channels was filled with eicosane having a low concentration (1-10% w/w) of Sudan Red dye, by pushing a few micrograms of the material into the channels with gentle pressure, the eicosane had a melting point of approximately 38° C., making it possible to locally melt the eicosane to allow channel filling, but prevent flow along the channel. When the substrate was warmed to this temperature the eicosane became mobile and was driven along the channel by capillary forces, thereby creating a circular pattern indicating that the device had been activated by having passed through a temperature threshold of 38° C.

Example 2

Figure 4A:
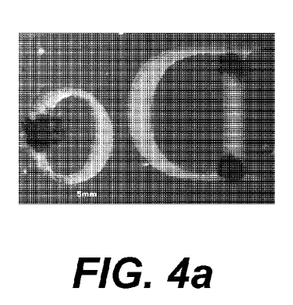
FIG. 4 shows optical micrographs of a temperature sensitive indicator device after it reaches the target temperature.
Figure 4B:
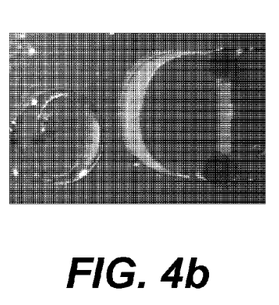
Figure 4C:
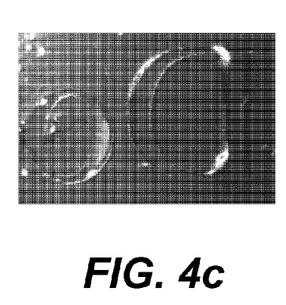

Channels were created on a PET substrate or a PE coated paper substrate using photolithography. Both Laminar and SU-8 50 photo-resist were used to create approximately 50 µm thick channels on the substrate. Alkanes with different melting points around 50° C. were used as the flowable indicator. Some oil soluble dye was added to improve visibility. Oil Red, Sudan Red and Oil Blue dyes were found to work well with octadecane, nonadecane and eicosane, by simply adding a small quantity (1-10% w/w) of solid Sudan Red dye to a molten solution of the alkane. SU-8 50 was used in preference to the Laminar resist since it is near transparent, making the unfilled channels difficult to detect on the PET substrate. The resist was spin coated for 30 seconds at 500 rpm followed by 40 seconds at 2000 rpm to result in an approximately 50 µm thick layer. Soft-bake times of approximately 5 minutes at 65° C. and approximately 20 minutes at 95° C. were required to cure properly before exposure. Exposure was 1000 units using a Spektra Proof UV contact frame. This was found to be the optimum exposure time. A further 1 minute at 65° C. followed by 5 minutes at 95° C. post bake was adequate to ensure good development. Five to six minutes in Microposit 'EC-Solvent' developer was found to produce good feature fidelity. Ten minutes baking at approximately 90° C. was found to give adequate hardening of the resist. Channels were partially filled by pushing a few micrograms of eicosane with 1-10% w/w Sudan Red dye, into the channels with gentle pressure, the eicosane had a melting point of approximately 38° C., making it possible to locally melt the eicosane to allow channel filling, but prevent flow along the channel. When the substrate and channels were heated above the melting point of the wax the liquid was driven along the channel by capillary forces. FIG. 4 shows a series of images showing the progression of eicosane with Sudan Red dye in Laminar photoresist channels on PET over a period of 2 minutes. FIG. 4(a) shows the sample before heating, FIG. 4(b) the sample when the temperature reaches 38° C. and FIG. 4(c) two minutes later after the material has wicked along the channels.

Example 3

Figure 5A:
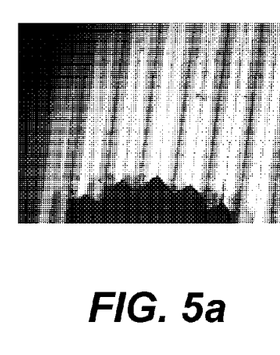
FIG. 5 shows optical micrographs of a UV sensitive device after exposure to UV light.
Figure 5B:
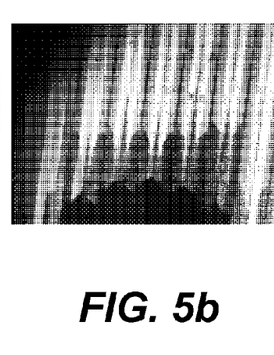
Figure 5C:
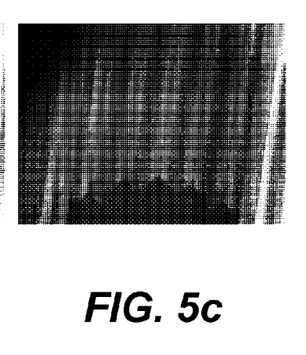

A sample of 500 µm pitch 'V' channels (3M SOLF film) was overcoated with a thin layer of titania 10 to 50 nanometers thick by chemical vapour deposition at 100° C. The titania was then rendered hydrophobic by spin coating 0.3% w/w Fluoroalkyl silane (FAS) in decane, to deposit a thin layer of the FAS on the titania. This increased the sensitivity to UV light since it has been shown that exposure of this layer to UV light causes catalytic destruction of the FAS layer rendering the titania surface hydrophilic. A liquid ink placed on this sample will not wick along the channels until they have been exposed to UV light to make them hydrophilic. In this example a small quantity of aqueous black ink with constituents;
Water+
Diethylene glycol—14-22%
Black colourant 13-14%
Butoxy tri glycol 10%
Urea 3-6%
Triethanolamine 1-3%
was placed into the channels and observed over time. Due to the FAS, the liquid has a large contact angle on the surface of the channel and so is initially immobile. After exposure to UV light however the FAS is catalytically destroyed, which reduces the contact angle on the channel surface and allows the liquid to be driven along the channel by capillary forces. In this example the sample was exposed to ambient UV and the change in contact angle on the channel surface took place slowly over several hours, so that the liquid took approximately 48 hours to advance 40 mm along the 'V' channels. This is an example of how the indicator may be used to indicate an accumulated amount of the stimulus, rather than a threshold crossing. FIG. 5 shows images of the aqueous black ink in UV sensitive channels, FIG. 5(a) shows that before exposure to UV light the ink is immobilized in the channels, images (b) and (c) show progression of the ink along the channels after a period of 24 and 48 hours respectively.

Example 4

This example demonstrates an irreversible switch using conductive ink or ionic liquid to make a connection.

Figure 6:
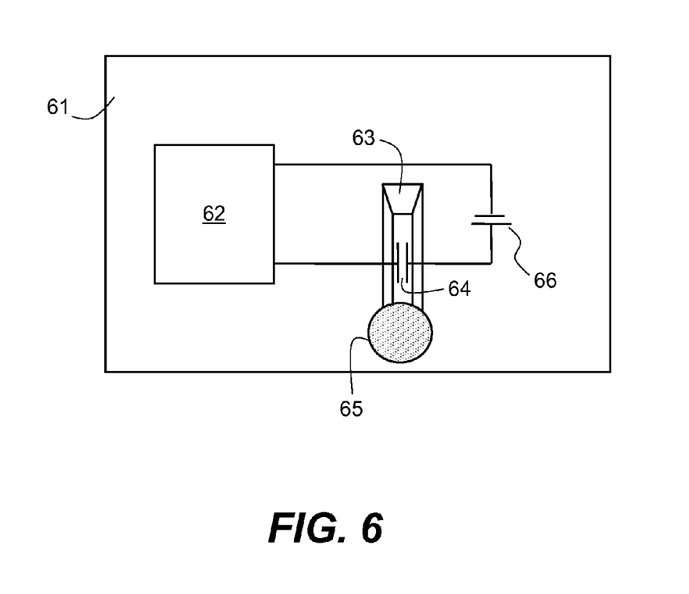
FIG. 6 illustrates an embodiment in which a flowable conductive liquid within a channel completes the connection between two conductive tracks.

FIG. 6 shows an example in which a substrate 61 has an electrical device 62 connected to a power source 66. The electrical circuit has a narrow break 64 situated within a capillary channel 63. A reservoir of flowable conductive material 65 is situated in or adjacent to the channel 63. The flowable material is initially immobile. This may be achieved by using a surface modification of the channel as described in the previous example, or it may be achieved using a low melting point material such as an alkane wax with a high concentration of conductive particles such as graphite. Alternatively an ionic liquid may be used. In this example a conductive wax of eicosane containing approximately 50% wt graphite particles was used. The capillary channel was created using SU8-50 photoresist processed as described earlier. The break in the electrical connection 64 can be designed to compensate for the generally low conductivity of the conductive ink by having a narrow gap between two extended, highly conductive tracks as shown in FIG. 6. In this situation, when the moderately conductive material has flowed between the two highly conductive tracks the overall resistance of the connection can be reduced to a reasonable level. In this example the break in the electrical connection was created in copper tracks using pre-sensitised circuit board from CIF. A gap of 0.5 mm between two 20 mm long, 1 mm wide copper tracks could be switched from open circuit to give a resistance of around 2-3 Ohms when the eicosane/graphite ink was flowed in-between the copper tracks.

Example 5

Figure 7A:
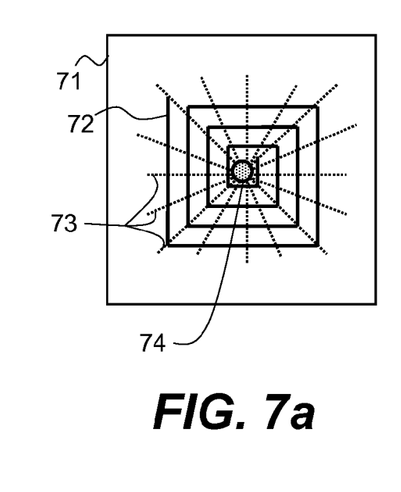
FIGS. 7a and 7b show an embodiment in which conductive ink is wicked along channels above a radio frequency antenna to de-tune the antenna.
Figure 7B:
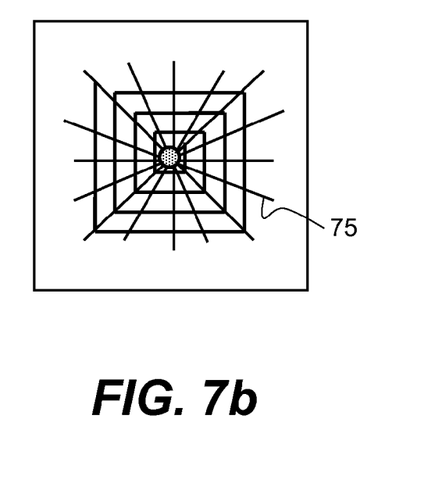
Figure 8A:
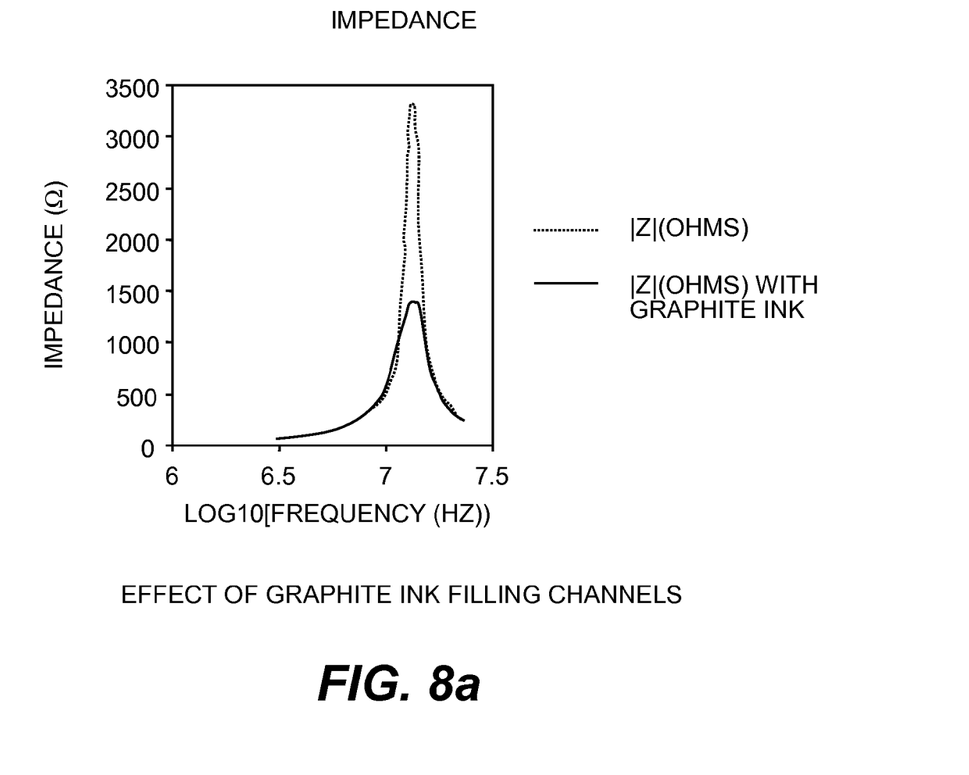
FIGS. 8a to 8c are graphs illustrating the results of example 5.
Figure 8B:
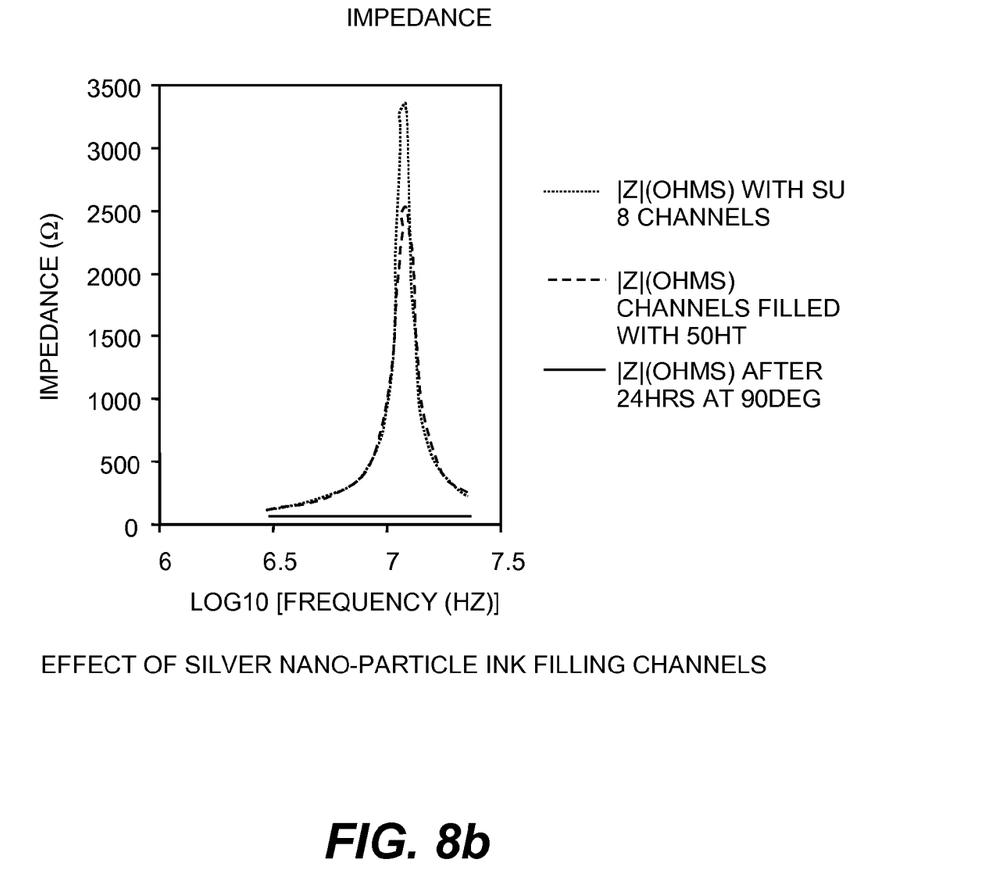
Figure 8C:
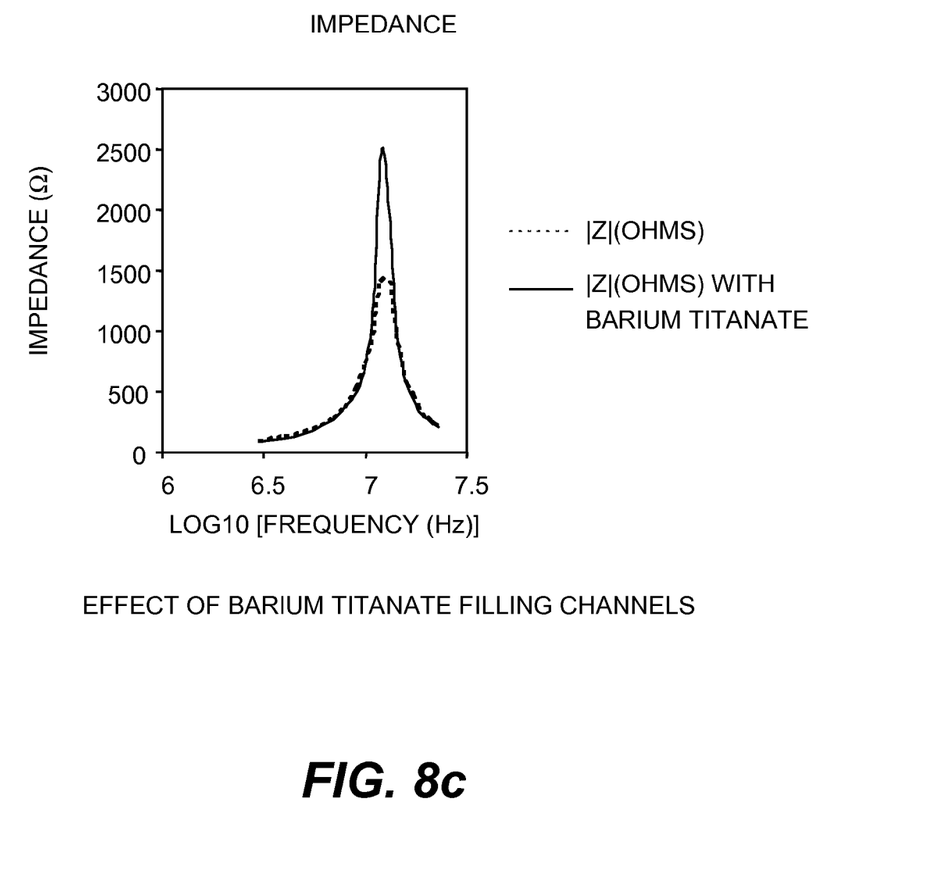

A demonstration of the use of conductive ink to de-tune an rf-id antenna is shown in FIG. 7. Radio frequency antennas were fabricated using pre-sensitized copper circuit board 71 from CIF. The board was patterned with a square spiral antenna 72 30 mm wide having a track and gap width of 1 mm. Exposure was performed with an RS UV source for 2 minutes, followed by 60 s in 1% NaOH developer. The board was then rinsed prior to etching in 40% wt Ferric Chloride at 65-70 deg. C. Capillary channels 73 0.5 mm wide radiating outwards from the centre of the spiral antenna were created on top of the rf antenna using SU8-50 photoresist. Flowable material was placed at the centre of the channels 74. The impedance of the Rf antenna was determined by measuring the amplitude of an applied radio frequency signal 10 MHz either side of 13.4 MHz, when the channels were empty (see FIG. 7a) and also after heating, when the channels were filled with conductive ink composed of graphite in an alkane wax, silver nanoparticle-based ink (Advanced Nano Products, Korea) and also a high dielectric constant ink composed of ~30% w/w barium titanate in eicosane, after it had flowed into the channels as shown in FIG. 7b. Results for the graphite based ink are shown in FIG. 8a; the impedance of the antenna is reduced from approximately 3500Ω to less than 15000Ω after the graphite based ink has filled the channels. Results for the silver nano-particle ink are shown in FIG. 8b; there is a slight reduction in the impedance from 3500Ω to 2500Ω after filling of the channels, since the conductivity of the silver ink is low until it has been sintered. After sintering at 90° C. for 24 hours the conductivity of the silver ink is greatly increased and the impedance of the antenna then becomes very low, of order 40Ω. Results for the barium titanate ink are shown in FIG. 8c, after the channels are filled there is a slight increase in the impedance from 1500Ω to 2500Ω.

It will be understood that the descriptions above are examples to illustrate the invention only and that many more applications fall within the scope of the claims.

The invention claimed is:

1. A temperature indicator device created on a surface, comprising: the surface being provided with at least one through-hole with at least two openings, wherein material in an immobile state is provided adjacent to a first opening of the through-hole, such that after application of a heat stimulus above a critical temperature the material changes state and becomes flowable and is directed into the first opening of the at least one through-hole by the action of capillary forces and emerges at the second opening, thereby providing an indication that the critical temperature has been exceeded, wherein the surface is further provided with at least one channel wherein the second opening of the at least one through-hole is located in the surface adjacent to the at least one channel, such that after application of a heat stimulus the material flows along said channel.

2. An indicator device created on a surface according to claim 1, comprising two surfaces, the first surface being provided with at least one channel, the second surface being provided with flowable material in a solid state, wherein the two surfaces are brought together such that the flowable material is adjacent to the channel, wherein, after application of a stimulus, the flowable material becomes mobile and is directed along the channel by the action of capillary forces thereby providing an indication of the application of the stimulus.

3. An indicator device created on a surface according to claim 1, the surface being provided with at least one channel, wherein the surface is also provided with flowable material in an immobile state in the form of a fluid adjacent to the channel where the wetting characteristics of the fluid and at least part of the surface prevent the fluid from wicking along the channel, such that after application of a stimulus, the wetting characteristics of the fluid and the at least part of the surface are altered such that the fluid becomes mobile and is directed along the channel by the action of capillary forces thereby providing an indication of the application of the stimulus.

4. An indicator device according to claim 2 wherein the flowable material is in contact with at least part of the channel.

5. An indicator device according to claim 2 wherein the flowable material is in contact with at least part of the channel.

6. An indicator device as claimed in claim 1 wherein the device comprises an electronic device wherein a characteristic of the electronic device is detectably changed by the movement of the flowable material.

7. An indicator device as claimed in claim 6 wherein the indicator device includes an antenna and wherein an operational characteristic of the antenna is detectably changed by the movement of the flowable material.

8. An indicator device as claimed in claim 6 wherein the flowable material is electrically conductive.

9. An indicator device as claimed in claim 1 wherein the device comprises a photonic device wherein a characteristic of the photonic device is detectably changed by the movement of the flowable material.

10. An indicator device as claimed in claim 1 wherein the flowable material is electrically conductive.

11. An indicator device as claimed in claim 1 wherein the flowable material is an etchant.

\* \* \* \* \*